United States Patent [19]
Clark

[11] 3,727,267
[45] Apr. 17, 1973

[54] MEAT TENDERIZING MACHINE

[76] Inventor: Cecil M. Clark, 16457 6th S.W., Seattle, Wash. 98166

[22] Filed: Sept. 10, 1971

[21] Appl. No.: 179,323

[52] U.S. Cl. ................................................17/25
[51] Int. Cl. ..........................................A22c 9/00
[58] Field of Search ........................................17/25

[56] References Cited

UNITED STATES PATENTS

| 3,641,625 | 2/1972 | Allinquant | 17/25 |
| 2,971,216 | 2/1961 | Gwilliam et al. | 17/25 |

FOREIGN PATENTS OR APPLICATIONS

| 329,350 | 6/1958 | France | 17/25 |

*Primary Examiner*—Louis G. Mancene
*Assistant Examiner*—D. L. Weinhold
*Attorney*—Christensen & Sanborn

[57] ABSTRACT

The machine is equipped with means defining a head which is reciprocable in a vertical plane and has a series of knives thereon that are conjointly reciprocable with the head between upper and lower limits in the plane thereof. It is also equipped with means including a pair of relatively upper and lower feed surfaces which are spaced apart from one another on one side of the plane, and continuously movable in the direction thereof to feed a piece of meat across the plane in a substantially continuously advancing course of travel between the reciprocable limits of the knives. In addition, there are means operable to reciprocate the head in unison with the motion of the surfaces, so that the piece of meat is pierced by the knives in the travel thereof. There are also stripper means operable to maintain the piece of meat in the course thereof when the knives are retracted from the meat, the knives being arranged in substantially a single row extending parallel to the plane, so that they pierce progressively rearwardly advanced segments of the piece of meat as they are reciprocated in relation thereto.

16 Claims, 8 Drawing Figures

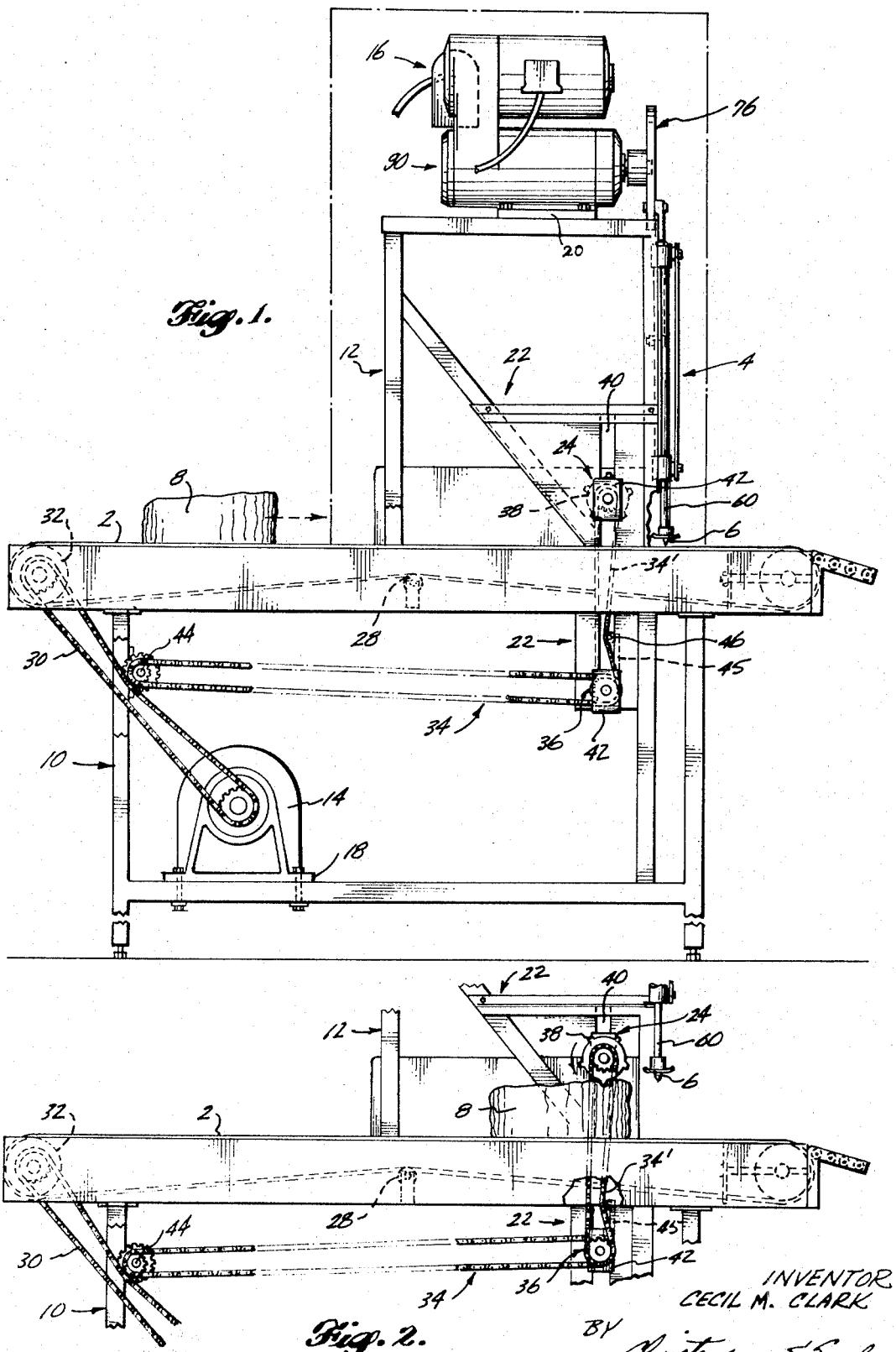

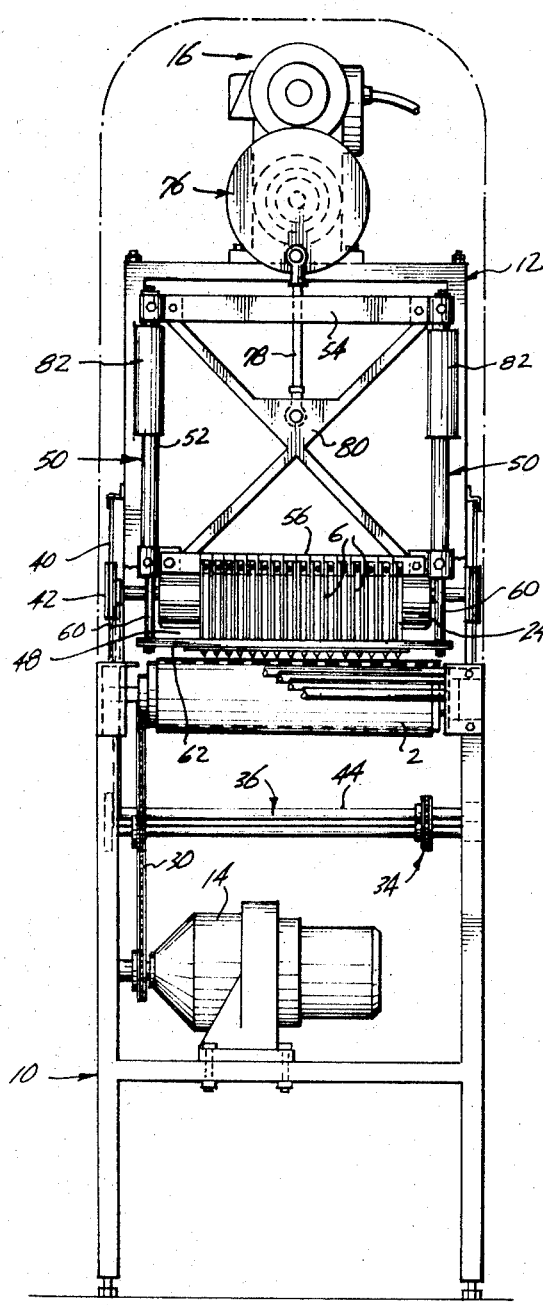
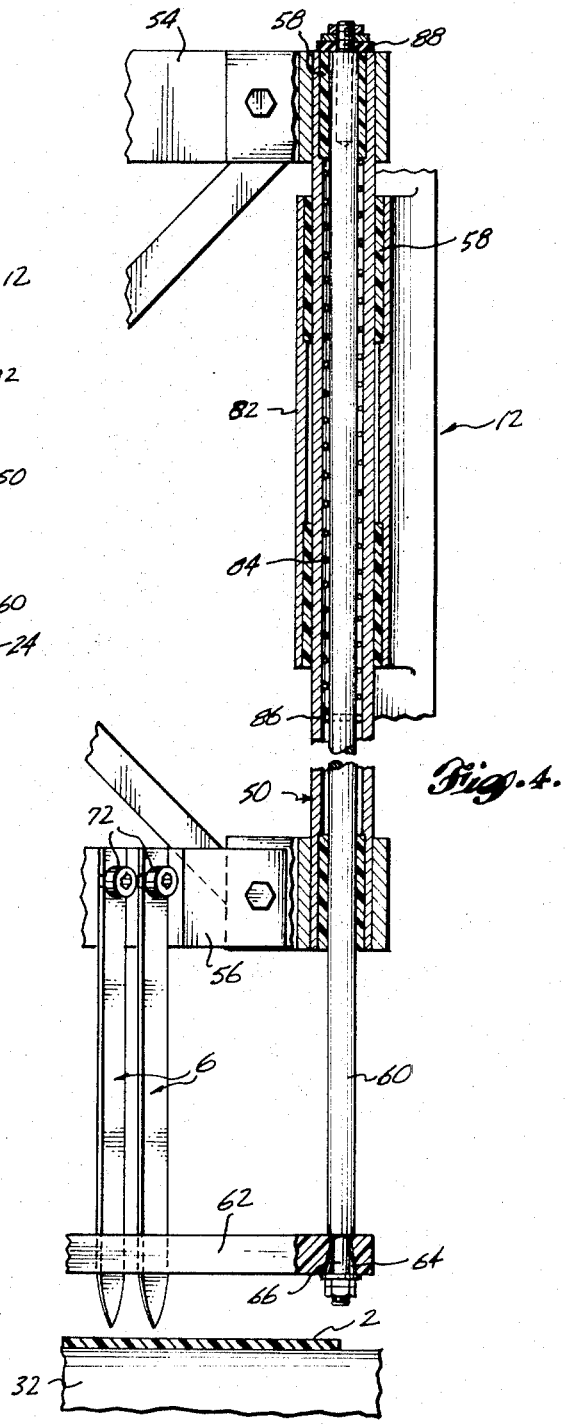
Fig. 3.
Fig. 4.

INVENTOR
CECIL M. CLARK
BY
Christensen & Sanborn
ATTORNEYS

MEAT TENDERIZING MACHINE

FIELD OF THE INVENTION

This invention relates to meat tenderizing machines; and in particular, to machines of this nature which are operable to tenderize the meat by cutting the fibers of the same at spaced intervals along the grain thereof.

BACKGROUND OF THE INVENTION INCLUDING CERTAIN OBJECTS THEREOF

Various types of meat tenderizing machines are known, but most employ a series of knives which are mounted on a vertically reciprocable head that is depressed at spaced intervals to impale the meat as it is advanced step-wise thereunder. Most also employ large numbers of the knives, and the knives are arranged in many rows, one behind another, in order to pierce large areas of the meat as it is advanced through each step of the operation. In this way, the operation as a whole is not unduly prolonged, and the meat is not subjected to an excessive number of strokes of the machine.

It is fact, however, that such a large bank of knives represents a considerable quantity of metal; and in order to impale the meat, and retract the knives, within a quick stroke of the machine, it is necessary to employ considerable force in driving the head, as well as considerable force in stripping the meat from the knives, as the knives are retracted therefrom. These forces in turn, produce considerable distortion or disruption in the characteristics of the meat, and particularly in the appearance and taste of the same. Too often the meat is smashed on the down stroke, and then squeezed on the up stroke, so that not only is the appearance of the meat affected, but in addition, its freshness and internal characteristics as well, in that the compression forces tend to extract some of the juices which are so important to the taste of the meat.

One object of the present invention, therefore, is to provide a meat tenderizing machine which avoids smashing and/or squeezing the meat, and which, to the contrary, effectively cuts the fibers of the meat without altering the character of the meat otherwise. Another object is to provide a machine of this nature which can employ a considerably lower number of knives on the head, so that the force needed to impale and retract the knives can be reduced to a minimum without impairing the operation of the machine otherwise. A further object is to provide a machine of this nature which employs a greatly reduced number of knives, to avoid damage to the meat as explained, but does not require additional time for processing the meat, and in fact, processes the meat in substantially less time than those prior art machines which used a large bank of knives on the head. A still further object is to provide a machine of this nature wherein the intervals at which the fibers are cut, can be adjusted over a wide range of distances without reimpaling the meat at any one point. Still another object is to provide a machine of this nature wherein all fibers of the meat are cut at the same spaced intervals, regardless of the initial orientation of the meat with respect to the knives, and regardless of the direction of the grain in the meat, or the number of directions which the grain assumes. Other objects include the provision of a machine of this nature wherein the knives can be readily repaired and/or replaced, simply by removing each knife individually as it requires attention, there being no necessity for removing the entire number of knives for the purpose of repairing or replacing a single knife only. Still further objects will become apparent from the description of the invention which follows hereafter.

SUMMARY OF THE INVENTION

These objects and advantages are realized by a meat tenderizing machine of my invention having means defining a head which is reciprocable in a vertical plane and has a series of knives thereon that are conjointly reciprocable with the head between upper and lower limits in the plane thereof. The machine also has means including a pair of relatively upper and lower feed surfaces which are spaced apart from one another on one side of the plane, and continuously movable in the direction thereof to feed a piece of meat across the plane in a substantially continuously advancing course of travel between the reciprocable limits of the knives. In addition, there are means operable to reciprocate the head in unison with the motion of the surfaces, so that the piece of meat is pierced by the knives in the travel thereof. There are also stripper means operable to maintain the piece of meat in the course thereof when the knives are retracted from the meat, the knives being arranged in substantially a single row extending parallel to the plane, so that they pierce progressively rearwardly advanced segments of the piece of meat as they are reciprocated in relation thereto.

Preferably, the surfaces are yieldably biased relatively toward one another, but there are stop means on the machine to form a nip of predetermined spacing therebetween, typical of that which is necessary to engage most slabs of meat processed in the machine.

Also, it is preferred that the lower feed surface extend endlessly across the plane, from the one side thereof to the other, below the lower reciprocable limit of the knives in the plane.

In the presently preferred embodiments of the invention, the lower feed surface is defined by an endless conveyor belt. The upper feed surface is defined by a cylindrical feed roll which is rotatably mounted on a pair of journal blocks that are reciprocably guided in a vertical plane and yieldably biased in the direction of the belt, there being stop means on the machine which abut the blocks to form the aforementioned nip between the belt and the roll. The bias may be generated by the drive means for the roll, as for example, where the roll is motor driven through a two part drive mechanism, the parts of which are relatively articulated to one another and pivotally interconnected with the motor and the roll, respectively, so that the weight of the mechanism yieldably biases the roll in the direction of the belt.

Preferably the belt extends horizontally through the reciprocable planes of the roll and the knives, and the roll has angularly spaced, axially extending ribs raised about the periphery thereof, to assist in feeding the meat through the course thereof.

The stripper means in these embodiments includes an eject member which is reciprocably guided on the head, and yieldably biased in the direction of the lower reciprocable limit of the knives in the plane, to reciprocate in conjunction with the knives in said direction, and stop means on the head to limit the travel of the member in said direction to a point within the range defined by the limits of the knives. Preferably, the lower reciprocable limit of the knives is interposed between the belt and the limit point in the travel of the eject member. Also, the knives are preferably reciprocably guided in the eject member.

In certain of these embodiments, the eject member takes the form of a normally horizontally disposed press plate which is slotted and has the knives reciprocably guided in the slots thereof. The plate is suspended between a pair of spaced, parallel, vertically oriented rods which are reciprocably guided in the head and yieldably biased in the direction of the lower limit of the knives, but there are stop means on the rods which cooperate with the stop means on the head to limit the travel of the rods in said direction, and means pivotally interconnecting the plate and the rods whereby the plate is conjointly reciprocable with the rods but can tilt in relation to the rods when the rods undergo disproportionate reciprocation.

In these embodiments, moreover, the knives are elongated and depend lengthwise from the head. Also, they are relatively thin in one transverse dimension thereof, and are canted at an acute angle to the plane in the other transverse dimension thereof.

They are also suspended from the head in a single row coinciding with the plane.

BRIEF DESCRIPTION OF THE DRAWINGS

These features will be better understood by reference to the accompanying drawings which illustrate one of the preferred embodiments.

In the drawings,

FIG. 1 is a side elevational view of the machine in use, with a cover thereover shown only in imaginary lines;

FIG. 2 is a part side elevational view at a later stage in the operation of the machine;

FIG. 3 is an end elevational view;

FIG. 4 is a part cross-sectional, part end elevational view;

DESCRIPTION OF THE PREFERRED EMBODIMENT

Figure 5:
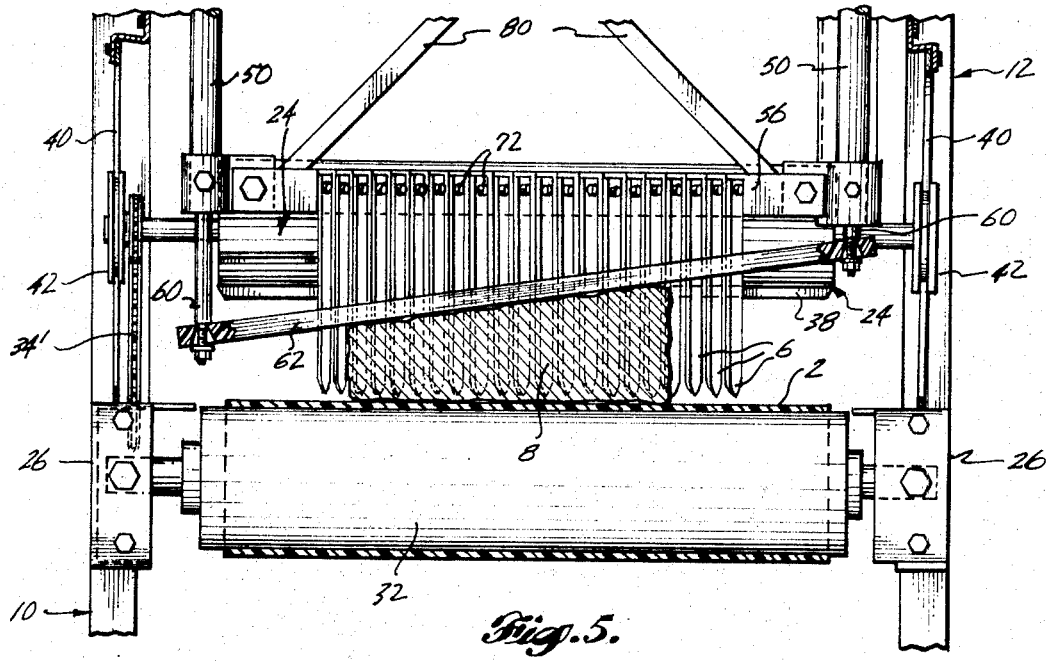
FIG. 5 is another such view in the later operational stage of FIG. 2.

Referring to the drawings, it will be seen that the machine comprises an elongated, horizontally disposed roller-mounted, chain-and-sprocket-driven endless conveyor belt 2, and a roll-fed reciprocable piercing and cutting mechanism 4 which is mounted thereabove, and operative to impale a set of slender, vertically oriented knives 6 in the meat 8, transversely thereof, as the meat travels left to right thereunder on the belt 2 in FIG. 1.

The belt 2 and mechanism 4 are mounted on a pair of upstanding trestle frames 10 and 12, which are superposed on one another with the respective drive motors 14 and 16 for the belt and mechanism carried thereon. The lower frame 10 is elongated crosswise of FIG. 1, to accommodate the belt 2 at table height on the top thereof, and is equipped with an underslung shelf 18, for carrying the drive motor 14 of the belt. The upper frame 12 is disposed to straddle the belt at the right hand or discharge end of the belt, and is equipped with an elevated shelf 20 for the motor 16 of the piercing and cutting mechanism 4. Both frames are also equipped with certain sheet metal overplating and strutting 22 on the sides thereof, which provide both reinforcement for the same and supporting side structure for the feed roll 24 of the piercing and cutting mechanism 4 as shall be explained.

Referring now to the details of the machine, it will be seen that the belt 2 is housed and journalled between a pair of spaced, parallel, right angularly cross sectioned horizontal beams 26 running lengthwise of and extending beyond the ends of the lower trestle frame 10. The belt 2 passes over a take-up roller 28 on the underside thereof, and is driven at the left-hand or infeed end thereof by means of a chain 30 strung between sprockets on the motor 14 and the roller 32 at this end of the belt. The chain 30 also serves to drive the feed roll 24 of the piercing and cutting mechanism 4, and accordingly the upper flight of the same is connected to the roll 24 through a two-part chain and sprocket drive mechanism 34 which includes an intermediate sprocket connection 36 that, like the feed roll 24, is reciprocably mounted to allow for various thicknesses of meat in the feed operation.

The feed roll 24 has a series of longitudinally extending, angularly spaced, peripherally outstanding ribs 38 thereon, and is suspended above the belt to be vertically displaceable by the meat, with respect thereto. On either side of the belt, within the strutted sideplating 22 of the frames, is a pair of vertically oriented slots 40 which have pairs of relatively upper and lower H-cross-sectioned slides 42 engaged therein, the upper of which are horizontally aligned with one another from slot to slot, above the belt, and the lower of which are similarly aligned below the belt. The feed roll 24 is journalled in and suspended between the upper slides, and the sprockets of the intermediate connection 36 in the drive mechanism for the same, are carried on a shaft 44 which is journalled in and suspended between the lower slides. The latter slides also have outrigger arms 45 thereon by which a take-up roller 46 is also interposed in the slots 40, to tension the last stage 34' of the drive mechanism 34 of the roll. Stops (not shown) abut the slides 42 to limit the downward travel of the roll 24 so that by its weight alone, mechanism 34 normally assumes the condition of FIG. 1, wherein the roll 24 remains elevated a sufficient distance above the belt to accommodate the typical thickness of the meat 8 to be tenderized. Because of the two-stage nature of the mechanism 34, however, the roll has considerable freedom to be displaced in the upward direction as it engages the meat and "climbs" across it, in cooperating with the belt 2 to feed the meat forward to and through the piercing and cutting mechanism 4. The belt 2, meanwhile, acts primarily as an on-going but relatively slidable surface for supporting the meat in transverse relationship to the piercing and cutting mechanism 4, while the roll 24 feeds it through and away from the nip 48 therebetween. The nip, of course, is only lightly attended by the belt and the roll, so that the meat undergoes little, if any, compression in passing through it.

The motor 14 may have a variable speed capability to enable the speeds of the belt and the roll to be adjusted within prescribed limits, which, in turn, are coordinated with the speed of the piercing and cutting mechanism 4, as shall be explained.

The piercing and cutting mechanism 4 comprises a reciprocably guided and driven quadrilateral shuttle frame 50 which is vertically oriented in a crosswise plane perpendicular to the belt, and equipped with vertical posts 52 joined by upper and lower crossrails 54 and 56, respectively, therebetween. The posts 52 are tubular in cross section, and have pairs of Teflon sleeves 58 secured within the upper and lower ends thereof, which act as guides for a pair of vertically oriented rods 60 that are slidably received in the posts and have a flat, narrow, horizontally disposed crossbar 62 supported at the lower ends thereof. The crossbar 62 is saddled on the rods 60, at complementarily dovetailing round shouldered apertures 64 and circumferential notches 66 therein, respectively, which enable the crossbar to assume a canted disposition with respect to the rods, when the rods are disproportionately raised and lowered in the posts 52. The cross-bar 62 also has a series of equally longitudinally spaced slots 68 therein, all of which are transversely oriented to the bar 62 at 45° angles, and round shouldered like the apertures 64. The slots 68 serve as guide bearings for the knives 6, which are bayonet-like in shape and length, and suspended in the slots 68 from attachment points on the lower crossrail 56 of the shuttle frame 50. The latter crossrail 56 is sturdy and block-like in construction, and has a series of stepped indentations 70 in the forward edge thereof which are likewise transversely oriented at 45° angles to the bar. The indentations 70 are equipped with set screws 72 that serve to fix the upper ends of the knives 6 to the rail by means of lateral notches 74 therein. Thus, the knives 6 are cojointly reciprocable with the shuttle frame 50 in use, while being relatively reciprocably guided in the crossbar 62 when the bar undergoes reciprocation with respect to the frame.

The frame 50 is reciprocated by an eccentric drive mechanism 76 on the motor 16, the arm 78 of which is articulatively connected with a cruciate, gusset-plated lattice work 80 in the frame. The reciprocating action occurs within a pair of guide sleeves 82 that are bracketed from the forward end of the upper trestle frame 12; and in its depressed condition, the shuttle frame 50 assumes the position seen in FIGS. 3 and 4, wherein the knives 6 are halted just short of the belt 2. Meanwhile, in the absence of the meat 8, the crossbar 62 also assumes a depressed but slightly more elevated position, due to the bias of a pair of coiled springs 84 that are caged about the rods 60 in the posts 52, between the upper Teflon sleeves 58 and a pair of stop pins 86 on the rods. The springs 84 depress the crossbar until a pair of built-up stop collars 88 on the upper ends of the rods, abut the upper ends of the posts. In the presence of the meat, however, the crossbar 62 engages the upper surface of the meat, in the downward travel of the eccentric 76, then reacts against the springs 84 and rides on top of the meat as in FIG. 5; the springs 84 meanwhile serving to maintain the crossbar against the meat but only under light pressure so that the meat is not compressed as the knives enter and leave it, and then enter and leave the next cross portion therebehind, progressively from portion to portion, as the meat is fed out of the nip 48 and through the plane of the piercing and cutting mechanism 4, by the roll 24 and the belt 2. Also, regardless of the initial orientation, or misorientation, of the meat on the belt, with respect to the plane of the mechanism, the roll and belt tend to put the meat through the mechanism at an orientation in which the 45° mitered knives 6 of the same, effectively crosscut all fibers of the meat, as in FIG. 8. This is also true whether the meat has a grain in one, two, or three directions.

Figure 8:
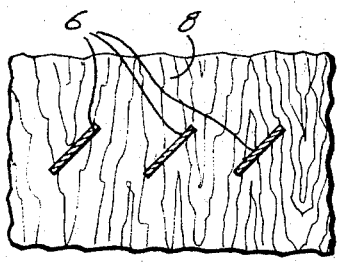
FIG. 8 is another such view at the level of the meat.

FIG. 8 also illustrates the fact that the knife cuts never overlap with one another from one "hit" to the next. Because of this, one or the other, or both, of the motor units 14 and 16, can be altered in speed to vary the frequency, and therefore, the number of "hits" per unit length. In the present case, the motor 16 of the mechanism 4 itself has a selective speed change device 90 included therewith, in the drive to the eccentric.

Figure 7:
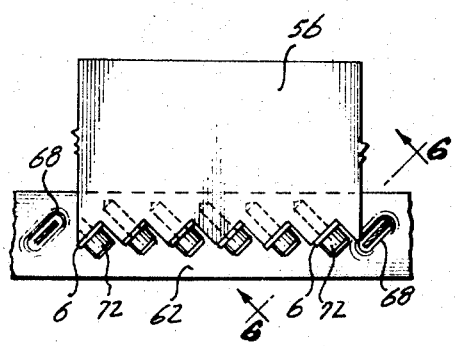
FIG. 7 is a part cross sectional, part plan view.
Figure 6:
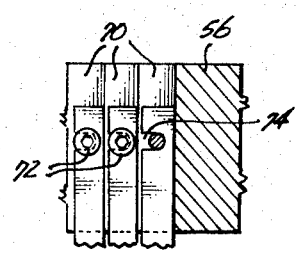
FIG. 6 is a third such view.

Under some circumstances, a second row of knives may be added to the frame, in tandem with that shown; but one disadvantage of this arrangement is the difficulty of replacing a broken knife. In the illustrated arrangement, the knives 6 are easily seen and easily reached for this purpose, as is apparent in FIGS. 5–7. It will be apparent that they may also be replaced one at a time, simply by withdrawing and replacing the set screws 72 of the respective knife.

What is claimed is:

1. In a meat tenderizing machine, means defining a head which is reciprocable in a vertical plane and has a series of knives thereon that are conjointly reciprocable with the head between upper and lower limits in the plane thereof, means including a pair of relatively upper and lower feed surfaces which are spaced apart from one another on one side of the plane, and continuously movable in the direction thereof to feed a piece of meat across the plane in a substantially continuously advancing course of travel between the reciprocable limits of the knives, means operable to reciprocate the head in unison with the motion of the surfaces, so that the piece of meat is pierced by the knives in the travel thereof, and stripper means operable to maintain the piece of meat in the course thereof when the knives are retracted from the meat, the knives being arranged in substantially a single row extending parallel to the plane, so that they pierce progressively rearwardly advanced segments of the piece of meat as they are reciprocated in relation thereto.

2. The meat tenderizing machine according to claim 1 wherein the surfaces are yieldably biased relatively toward one another, but there are stop means on the machine to form a nip of predetermined spacing therebetween.

3. The meat tenderizing machine according to claim 1 wherein the lower feed surface extends endlessly across the plane, from the one side thereof to the other, below the lower reciprocable limit of the knives in the plane.

4. The meat tenderizing machine according to claim 1 wherein the lower feed surface is defined by an endless conveyor belt.

5. The meat tenderizing machine according to claim 4 wherein the upper feed surface is defined by a cylindrical feed roll which is rotatably mounted on a pair of journal blocks that are reciprocably guided in a vertical plane and yieldably biased in the direction of the belt, there being stop means on the machine which abut the blocks to form a nip of predetermined spacing between the belt and the roll 6. The meat tenderizing machine according to claim 5 wherein the feed roll is motor driven through a two-part drive mechanism, the parts of which are relatively articulated to one another and pivotally interconnected with the motor and the roll, respectively, so that the weight of the mechanism yieldably biases the roll in the direction of the belt.

7. The meat tenderizing machine according to claim 5 wherein the belt extends horizontally through the reciprocable planes of the roll and the knives.

8. The meat tenderizing machine according to claim 5 wherein the feed roll has angularly spaced, axially extending ribs raised about the periphery thereof.

9. The meat tenderizing machine according to claim 1 wherein the stripper means includes an eject member which is reciprocably guided on the head and yieldably biased in the direction of the lower reciprocable limit of the knives in the plane, to reciprocate in conjunction with the knives in said direction, and stop means on the head to limit the travel of the member in said direction to a point within the range defined by the limits of the knives.

10. The meat tenderizing machine according to claim 9 wherein the lower feed surface extends across the plane below the lower reciprocable limit of the knives therein, and the lower reciprocable limit of the knives is interposed between the lower feed surface and the limit point in the travel of the eject member.

11. The meat tenderizing machine according to claim 10 wherein the knives are reciprocably guided in the eject member.

12. The meat tenderizing machine according to claim 9 wherein the eject member takes the form of a normally horizontally disposed press plate which is slotted and has the knives reciprocably guided in the slots thereof.

13. The meat tenderizing machine according to claim 12 wherein the plate is suspended between a pair of spaced parallel vertically oriented rods which are reciprocably guided in the head and yieldably biased in the direction of the lower reciprocable limit of the knives, but there are stop means on the rods which cooperate with the stop means on the head to limit the travel of the rods in said direction, and means pivotally interconnecting the plate and the rods whereby the plate is conjointly reciprocable with the rods but can tilt in relation to the rods when the rods undergo disproportionate reciprocation.

14. The meat tenderizing machine according to claim 1 wherein the knives are elongated and depend lengthwise from the head.

15. The meat tenderizing machine according to claim 14 wherein the knives are relatively thin in one transverse dimension thereof, and are canted at an acute angle to the plane in the other transverse dimension thereof.

16. The meat tenderizing machine according to claim 1 wherein the knives are suspended from the head in a single row coinciding with the plane.

* * * * *